(12) United States Patent
Schroeder et al.

(10) Patent No.: US 9,433,314 B2
(45) Date of Patent: Sep. 6, 2016

(54) PIVOTABLE SUPPORT SYSTEM AND APPARATUS FOR A MAILBOX

(71) Applicant: Global Insight Marketing, Inc., Carmel, IN (US)

(72) Inventors: Brian D. Schroeder, Carmel, IN (US); Duane M. Durkos, Zionsville, IN (US)

(73) Assignee: Global Insight Marketing, Inc., Carmel, IN (US)

( * ) Notice: Subject to any disclaimer, the term of this patent is extended or adjusted under 35 U.S.C. 154(b) by 0 days.

(21) Appl. No.: 14/745,016

(22) Filed: Jun. 19, 2015

(65) Prior Publication Data
US 2015/0374158 A1 Dec. 31, 2015

Related U.S. Application Data

(60) Provisional application No. 62/019,390, filed on Jun. 30, 2014.

(51) Int. Cl.
*A47G 29/14* (2006.01)
*A47G 29/122* (2006.01)
*F16M 11/08* (2006.01)

(52) U.S. Cl.
CPC ....... *A47G 29/1216* (2013.01); *A47G 29/1209* (2013.01); *F16M 11/08* (2013.01)

(58) Field of Classification Search
CPC ................ A47G 29/1209; A47G 29/1216; F16M 11/08
USPC ....... 248/131, 415, 418, 349.1, 580; 232/17, 232/38, 39
See application file for complete search history.

(56) References Cited

U.S. PATENT DOCUMENTS

| | | | | | |
|---|---|---|---|---|---|
| 2,720,372 | A | * | 10/1955 | Gowan | F16M 11/04 248/186.2 |
| 3,407,997 | A | * | 10/1968 | Wood | A47G 29/1216 232/39 |
| 5,400,958 | A | * | 3/1995 | Walker | A47G 29/1216 232/39 |
| 5,458,286 | A | * | 10/1995 | Paschal | A47G 29/1216 232/39 |
| 5,622,343 | A | * | 4/1997 | Morton | A47G 29/1216 232/17 |
| 5,699,989 | A | * | 12/1997 | Guthrie | A47G 29/1216 232/39 |
| 7,249,704 | B1 | * | 7/2007 | Smith | A47G 29/1216 232/39 |
| 7,992,767 | B1 | * | 8/2011 | Holmes | A47G 29/1216 232/39 |
| 8,196,876 | B2 | * | 6/2012 | Zhou | F16M 11/08 248/125.7 |
| 8,322,598 | B1 | * | 12/2012 | Farentinos | A47G 29/1216 232/39 |
| 8,490,859 | B1 | | 7/2013 | Master et al. | |
| 2015/0129731 | A1 | * | 5/2015 | Podlin | F16M 11/08 248/289.11 |

\* cited by examiner

*Primary Examiner* — Anita M King
(74) *Attorney, Agent, or Firm* — Faegre Baker Daniels LLP

(57) ABSTRACT

A rotating mailbox device is provided. The device includes a base plate having a fulcrum post fixed thereto and a position plate having at least one retaining hole defined therein. There is a spring positioned within the retaining hole and a ball bearing positioned at least partially within the retaining hole. The system also includes a box bracket rotatably coupled to the base plate via the fulcrum post. The box bracket has at least one retainer hole defined therein. The box bracket has a first position that aligns a first retainer hole of the box bracket of the at least one retainer hole with a first retaining hole of the at least one retaining hole of the position plate.

16 Claims, 2 Drawing Sheets

PIVOTABLE SUPPORT SYSTEM AND APPARATUS FOR A MAILBOX

PRIORITY

The present application is a non-provisional application that claims priority to U.S. Provisional Application 62/019,390 filed Jun. 30, 2014 titled PIVOTABLE SUPPORT SYSTEM AND APPARATUS FOR A MAILBOX, the priority of which is hereby claimed and the disclosure of which is hereby expressly incorporated by reference.

FIELD OF THE DISCLOSURE

The present disclosure generally relates to structures for mounting mailboxes to supports. The present disclosure relates more specifically to structures for pivotally mounting mailboxes to supports to provide non-destructive changes in angles between the mailbox and the support.

BACKGROUND OF THE DISCLOSURE

Mailboxes are generally mounted to posts and located such that mail carriers can readily access them and deposit mail therein. The posts can be vertical posts, horizontal posts, or otherwise. Mailboxes are traditionally screwed, nailed, or otherwise fixedly coupled to the post.

Mailboxes, specifically mailboxes disposed near roadways are also popular targets for vandalism. Mailboxes near roadways are further susceptible to being struck by vehicles. Retrieval of items from mailboxes often also involves standing in a roadway and exposing oneself to traffic. Accordingly, what is needed is a mailbox mounting system that reduces the likelihood of the mailbox and/or post from sustaining damage or aids in limiting the damage sustained from a strike. What is further needed is a mailbox that is both accessible to be filled by a mail carrier in a vehicle and that is able to be emptied by an owner without fully entering the roadway.

SUMMARY

The present disclosure provides a system including a rotating mailbox device. The device includes a base plate having a fulcrum post fixed thereto and a position plate having at least one retaining hole defined therein. There is a spring positioned within the retaining hole and a ball bearing positioned at least partially within the retaining hole. The system also includes a box bracket rotatably coupled to the base plate via the fulcrum post. The box bracket has at least one retainer hole defined therein. The retainer hole is located such that the box bracket has a first position that aligns a first retainer hole of the box bracket of the at least one retainer hole with a first retaining hole of the at least one retaining hole of the position plate. The box bracket also has a second position wherein a condition is satisfied selected from the group of: 1) the first retainer hole of the box bracket aligns with a second retaining hole of the at least one retaining hole the position plate; and 2) the first retaining hole of the position plate aligns with a second retainer hole of the box bracket of the at least one retainer hole.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
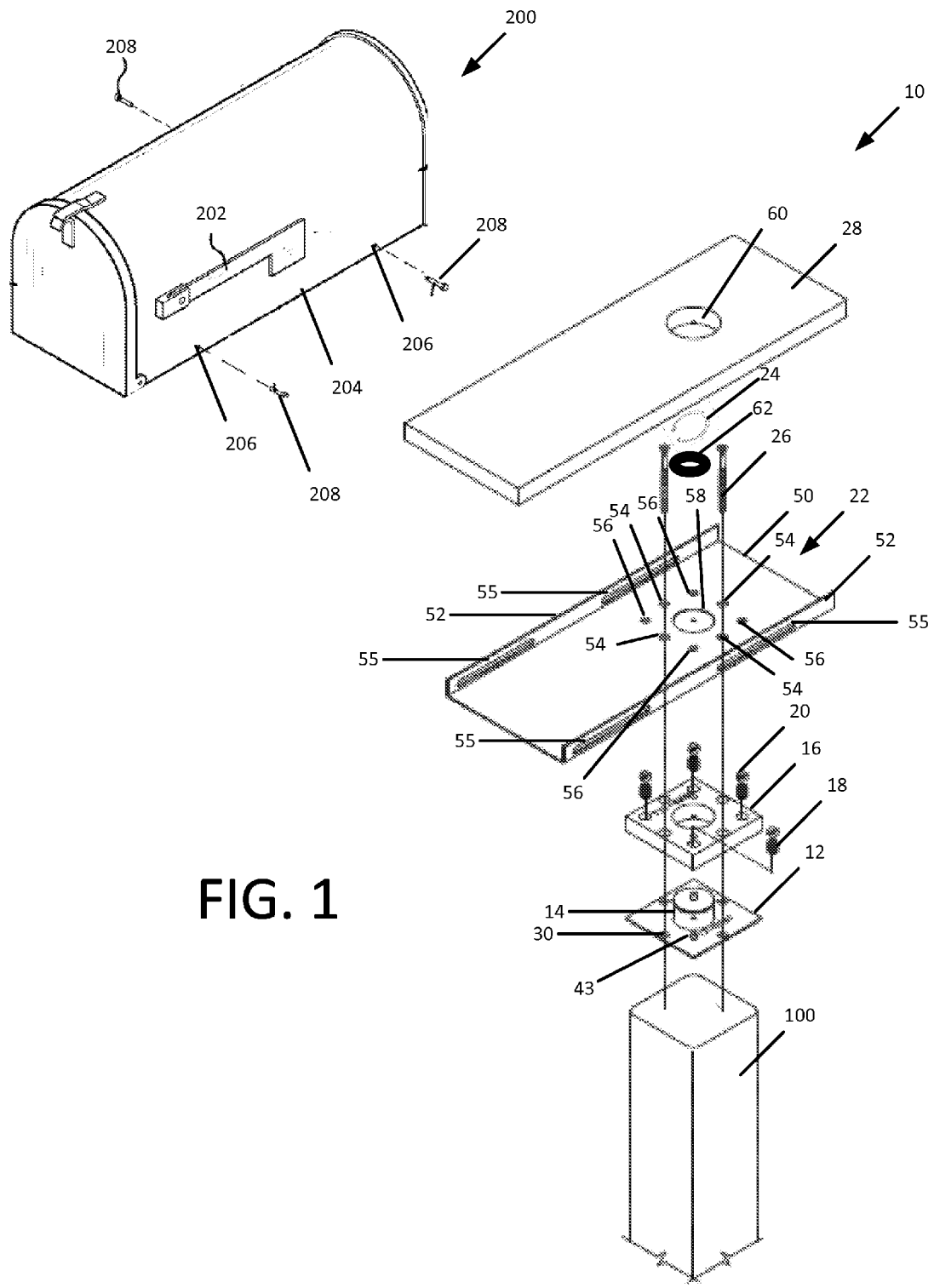
FIG. 1 is an exploded view of an embodiment of a mailbox mounting system of the present disclosure.
Figure 2:
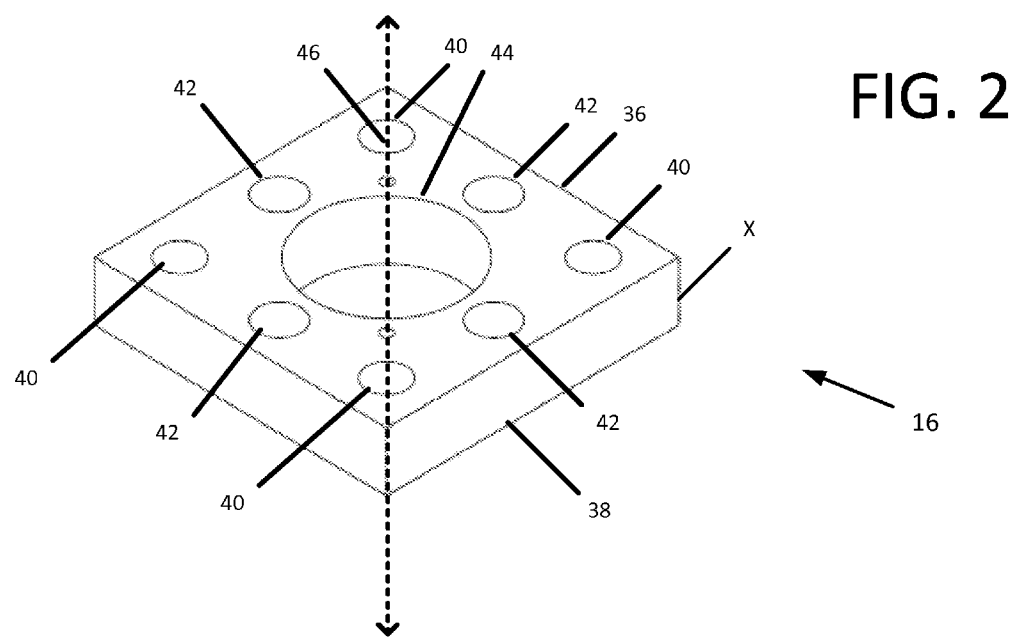
FIG. 2 is a perspective view of a position plate of the embodiment of the mounting system of FIG. 1.
Figure 3:
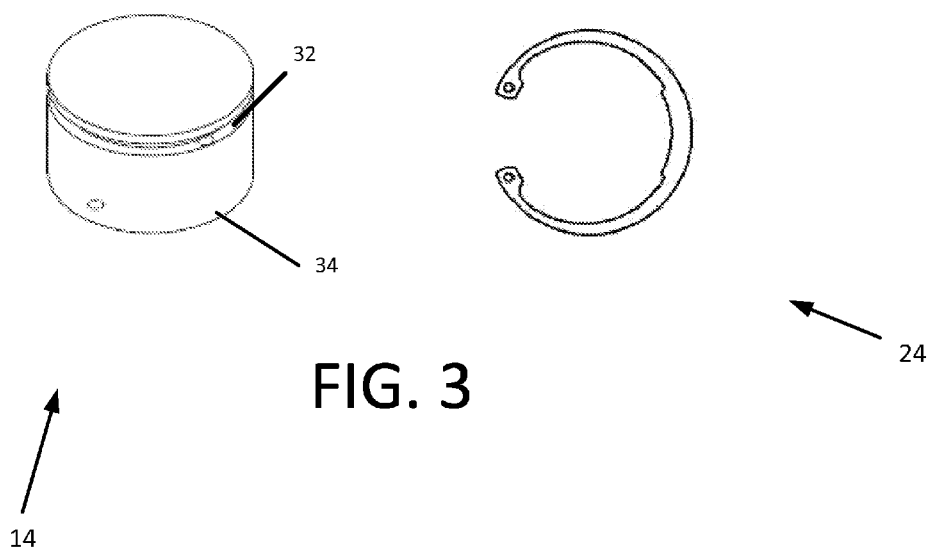
FIG. 3 is a perspective view of a fulcrum and retaining ring of the embodiment of the mounting system of FIG. 1.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring initially to FIG. 1, an illustrative mounting system 10 embodiment is shown. System 10 includes base plate 12, fulcrum post 14, position plate 16, springs 18, ball bearings 20, box bracket 22, retaining ring 24, screws 26, and wood slab 28.

Base plate 12 is illustratively constructed from metal and powder coated to provide weather resistance. Base plate 12 includes fulcrum attachment bores (not shown), two position attachment holes 43, and post attachment bores 30. As will be discussed more later, post attachment bores 30 are sized and positioned to receive screws 26 to couple system 10 to post 100 (shown as a vertical post). Fulcrum attachment bores are positioned to receive bolts or other attachment means that engage bores of fulcrum 14 to affix fulcrum 14 thereto. Position attachment bores 43 receive screws therein that couple position plate 16 to base plate 12. Base plate 12 is illustratively square and smaller than 3.5"×3.5" to fit on the end of a standard 4"×4" post.

Fulcrum 14 is a cylindrical member having bores disposed in the bottom thereof and having an annular slot recess 32 near the top thereof. The distance between a bottom 34 of the fulcrum 14 and the lower edge of slot recess 32 is at least slightly larger than a height (thickness "X") of position plate 16. Slot recess 32 is sized and shaped to receive retaining ring 24 therein.

Position plate 16 is illustratively square (again such as 3.5"×3.5") with a thickness "X." Position plate 16 has a top 36 and bottom 38. Position plate 16 includes four through-holes 42, four retainer holes 40, and fulcrum hole 44. Through-holes 42 have a diameter suitable to allow screws 26 (including screw heads) to pass therethrough unimpeded. Through-holes 42 extend the full length of thickness X to extend from top 36 to bottom 38 of position plate 16. Through-holes 42 are offset from each other by 90-degrees. Through-holes 42 are sized and positioned to align with post attachment bores 30 of base plate 12. Through-holes 42 are all located at an identical distance from the center axis 46 of position plate 16. Thus, rotation of position plate 16 by 90-degrees results in another through-hole 42 being located where a different through-hole 42 was previously located. Through holes 42 further include a portion near the bottom thereof that have a smaller diameter than the rest of through holes 42 such that heads of screws 26 are unable to pass through the portion having reduced diameter.

Retainer holes 40 are offset from each other by 90-degrees and offset from through-holes by 45-degrees. Retainer holes 40 are located radially further away from center axis 46 than through-holes 42. Retainer holes 40 are open at top 36 of position plate 16 and fully extend to bottom 38 of position plate 16. Retainer holes 40 are all located at an identical distance from the center axis 46 of position plate 16. Thus, rotation of position plate 16 by 90-degrees results in another retainer hole 40 being located where a different retainer hole 40 was previously located. Retainer holes 40 are illustratively the same size as through-holes 42.

Fulcrum hole 44 is circular (cylindrical) and extends the full thickness "X" to extend from top 36 to bottom 38 of position plate 16. Fulcrum hole 44 is located in the center of position plate 16 and is centered on central axis 46. Fulcrum hole 44 is sized to have a diameter that is slightly larger than the diameter of fulcrum 14. Position plate 16 further includes holes in the bottom thereof aligned with position bores 43 of base plate 12.

Springs 18 are illustratively coil springs. Springs 18 have an outer coil diameter that is smaller than the diameter of retainer holes 40. Ball bearings 20 are spherical and are likewise sized to have a diameter that is smaller than the diameter of retainer holes 40. The diameter of ball bearings 20 is further chosen to be greater than an internal diameter of springs 18 such that ball bearings 20 are unable to fall inside the coil of springs 18. The ball bearings 20 seat on the end of springs 18 such that when so seated, the combination of ball bearings 20 and uncompressed springs 18 have an overall length that is greater than the depth of retainer holes 40. Also, the combination of ball bearings 20 and springs 18 when springs 18 are fully compressed, provides an overall length that is near or less than the depth of retainer holes 40.

Box bracket 22 is a metal bracket having a base 50 and sides 52. Base 50 is planar, rectangular, and approximately 14.75" long by 6.125" wide. Base 50 further includes through-holes 54, retainer holes 56, and a fulcrum hole 58 that are oriented the same as through holes 42, retainer holes 40, and fulcrum hole 44, respectively. Through-holes 54 and fulcrum hole 58 are further sized the same as through-holes 42 and fulcrum hole 44. However, retainer holes 56 have a diameter that is smaller than retainer holes 40. Indeed, retainer holes 56 have a diameter that is smaller than the diameter of ball bearings 20 such that ball bearings 20 are unable to pass through retainer holes 56. In one example, retainer holes 56 have a diameter that is less than 50% of the diameter of ball bearings 20. The set of through-holes 54, retainer holes 56, and a fulcrum hole 58 are offset towards a rear end of base 50. However, embodiments are envisioned where the set of through-holes 54, retainer holes 56, and a fulcrum hole 58 are at a central location on base 50.

Sides 52 are planar and extend upwards at 90-degree angles relative to base 50 on opposing lateral sides of base 50. Sides 52 extend the full length of base 50. Each side 52 has a plurality of attachment holes 55 defined therein. Attachment holes 55 are illustratively oblong holes that extend in the front-to-back direction.

Retaining ring 24 is a standard retaining ring that is sized to fit within annular slot recess 32. The outer diameter of retaining ring 24 is greater than the diameter of fulcrum hole 58 of box bracket 22.

Wood slab 28 is approximately 17" long by 5.875" wide, which is the same dimensions as base 50. Wood slab 28 includes fulcrum bore 60. Fulcrum bore 60 is positioned to be co-axial with fulcrum hole 58 when wood slab is aligned with base 50. Fulcrum bore 60 has a diameter that is greater than the outer diameter of retaining ring 24 such that retaining ring 24 can be freely received therein.

Having described the various parts, the interaction of those parts and their operation will now be addressed. In assembly, fulcrum 14 is fixed to base plate 12 via bolts engaging fulcrum attachment bores of base plate 12 and the bores disposed in the bottom of fulcrum 14. Position plate 16 is mounted on base plate 12 such that fulcrum 14 is received in and passes through fulcrum bore 44. Position plate 16 is then fixed to base plate 12 via screws/bolts passing through position bores 43 and engaging position plate 16. With position plate 16 and base plate 12 so mounted, base plate 12 provides lower boundaries for retainer holes 40 and for through holes 42. A spring 18 is then placed in each of retainer holes 40. A ball bearing 20 is then placed on each spring 18. Box bracket 22 is then attached such that fulcrum hole 58 receives fulcrum 14. Nylon washer 62 is a flat washer abutted to box bracket 22 to encircle fulcrum post 14. Also, it should be appreciated that retainer holes 56 align with and partially receive ball bearings 20 therein. Downward pressure is placed on box bracket 22 to at least partially compress springs 18. Box bracket 22 is moved downward such that annular slot recess 32 is accessible above base 52. With box bracket 22 so positioned, retaining ring 24 is then mounted in slot recess 32. Given that the outer diameter of retaining ring 24 is greater than the diameter of fulcrum hole 58, when downward pressure is no longer applied to box bracket 22, springs 18 are unable to push box bracket 22 out of engagement with fulcrum 14. Indeed, retaining ring 24 abuts nylon washer 62 such that nylon washer 62 provides a bearing surface.

It should be further appreciated that when ball bearings 20 are engaging respective retainer holes 56, through holes 54 are aligned with through holes 42 and post attachment bores 30. Accordingly, given the assembled system 10 (except for wood slab 28), system 10 is coupled to post 100 via screws 26 by locating them in through-holes 54, 42, and post attachment bores 30. Post 100 is shown as a vertical post. However, the system of the present disclosure works with non-vertical posts, such as horizontal posts. Mailboxes are often mounted such that they present a level internal floor. However, there is no requirement that the internal floor of the mailbox be level. Accordingly, the present disclosure is applicable to any orientation of mailbox and post.

With system 10 mounted on post 100, wood slab 28 is laid on box bracket 22, between sides 52. Fulcrum bore 60 extends over and partially receives fulcrum 14 and retaining ring 24 therein. Fulcrum bore 60 is shown as extending fully through wood slap 28. However, embodiments are envisioned where fulcrum bore 60 only extends partially through wood slab 28. In such embodiments, the depth of fulcrum bore 60 is sized to provide clearance for fulcrum 14 and retaining ring 24 in assembly. Such embodiments further provide reduced exposure for fulcrum 14 and therefore provide a reduced opportunity for contaminants to access fulcrum 14.

At this point, a standard US mailbox 200 (T1, T2, T3 standards, etc.) including flag 202 is attached to system 10. A standard US mailbox 200 has flange portions 204 that run the depth of mailbox 200 and extend beneath a floor of mailbox 200. In assembly, these mailbox flanges 204 are located wider than side 52 such that they are on the outer sides thereof. Mailbox flanges 204 also have holes 206 (predrilled or made by an installer). Screws 208 or other attachment devices are then advanced horizontally through holes 206 in flanges 204, through attachment holes 55, and seated in wood slab 28. Mailbox 200 is thus attached to system 10.

With a mailbox 200 now mounted to post 100 via system 10, it should be appreciated that the mailbox 200 is ready for use. Additionally, system 10 provides for mailbox 200 to assume a plurality of rotational orientations relative to post 100. The force of springs 18 urging ball bearings 20 into retainer holes 56 hold box bracket 22 and the attached mailbox 200 in a first orientation relative to post 100. A rotational force applied to bracket 22 (and/or the mailbox) causes bracket 22 to begin to rotate about fulcrum 14. This movement urges ball bearings 20 out of retainer holes 56 and compresses springs 18 as retainer holes 56 become disaligned with retainer holes 40 (and ball bearings 20 and springs 18). While springs 18 and ball bearings 20 continue to provide some frictional engagement with box bracket 22, box bracket 22 is substantially free to rotate until it returns to its original position or rotates 90-degrees. When box bracket 22 returns to its original position or rotates 90-degrees, retainer holes 56 are again aligned with retainer holes 40, springs 18, and ball bearings 20. Ball bearings 20 are thus able to be urged upwards by springs 18 into engagement with retainer holes 56.

Thus, in cases when mailbox 200 is met with a force (being struck or otherwise), mailbox 200 is able to rotate relative to post 100 rather than transmitting all of the received force to the post 100. In addition to reducing damage to post 100 and mailbox 200 from strikes, the rotation of mailbox 200 also allows for mail to be retrieved therefrom by an owner by rotating mailbox 200 prior to opening it to retrieve and/or check its contents. Accordingly, the owner may be able reduce his/her exposure to traffic of a roadway when checking/filling/emptying mailbox 200.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A rotating mailbox device comprising:
   a base plate having a fulcrum post fixed thereto;
   a position plate having at least one retaining hole defined therein;
   a spring positioned within the retaining hole;
   a ball bearing positioned at least partially within the retaining hole;
   a box bracket rotatably coupled to the base plate via the fulcrum post, the box bracket having at least one retainer hole defined therein, the retainer hole located such that the box bracket has a first position that aligns a first retainer hole of the box bracket of the at least one retainer hole with a first retaining hole of the at least one retaining hole of the position plate, the box bracket having a second position wherein a condition is satisfied selected from the group of:
   1) the first retainer hole of the box bracket aligns with a second retaining hole of the at least one retaining hole of the position plate; and
   2) the first retaining hole of the position plate aligns with a second retainer hole of the box bracket of the at least one retainer hole.

2. The device of claim 1, wherein the first and second retainer holes of the box bracket are offset by 90-degrees about the fulcrum post and the first and second retaining holes of the position plate are offset by 90-degrees about the fulcrum post.

3. The device of claim 1, wherein each of the base plate, position plate, and box bracket have through holes that are co-axial when the box bracket is in the first position and in the second position.

4. The device of claim 3 wherein the through holes are sized and shaped to accept fasteners to fix the base plate and position plate relative to a mailbox post.

5. The device of claim 3, wherein the through holes are offset by 45-degrees relative to the retaining holes about the fulcrum post.

6. The device of claim 1, wherein the ball bearing is biased by the spring into engagement with the box bracket.

7. The device of claim 6, wherein the ball bearing is biased by the spring into engagement with the at least one retainer hole of the box bracket.

8. The device of claim 1, wherein the spring urges the box bracket out of engagement with the fulcrum post and a retaining ring coupled to the fulcrum post prevents the box bracket from disengaging from the fulcrum post.

9. The device of claim 1, wherein the box bracket includes a base and at least one side coupled to the base, the base including the at least one retainer hole, the at least one side extending generally perpendicular to the base.

10. The device of claim 9, wherein the at least one side includes a wall and at least one attachment hole positioned to receive a fastener to couple a mailbox to the box bracket.

11. The device of claim 10, further including a wood slab sized to fit on the box bracket between two walls of the at least one side wall, the wood slab positioned to receive the fastener that couples the mailbox to the box bracket.

12. The device of claim 1, wherein the spring has a compressed state where the overall length of the spring and ball bearing is less than a depth of the retaining hole defined in the position plate.

13. The device of claim 1, wherein the position plate is square.

14. The device of claim 1, wherein each retaining hole in the position plate has a matching retaining hole disposed on the opposing side of the fulcrum such that each spring has a matching spring providing an equal force on the opposing side of the fulcrum.

15. The device of claim 1, wherein the position plate includes four retaining holes.

16. The device of claim 15, wherein each retaining hole is located proximate a respective corner of the square position plate.

* * * * *